United States Patent [19]

Hamilton et al.

[11] Patent Number: 5,735,372
[45] Date of Patent: *Apr. 7, 1998

[54] VARIABLE CONSTANT FORCE HYDRAULIC COMPONENTS AND SYSTEMS

[75] Inventors: James M. Hamilton, Solana Beach; Lonnie K. Woods, Jacumba, both of Calif.

[73] Assignee: AimRite Systems International, Inc., Solana Beach, Calif.

[*] Notice: The term of this patent shall not extend beyond the expiration date of Pat. No. 5,529,152.

[21] Appl. No.: 633,928

[22] Filed: Apr. 17, 1996

Related U.S. Application Data

[63] Continuation of Ser. No. 272,208, Jul. 8, 1994, Pat. No. 5,529,152.
[51] Int. Cl.$^6$ ............................................ B60G 17/08
[52] U.S. Cl. ............................................ 188/299; 280/707
[58] Field of Search .................... 188/299, 285, 188/318, 322.13, 316; 280/707, 714; 251/129.01, 129.15

[56] References Cited

U.S. PATENT DOCUMENTS

5,529,152  6/1996  Hamilton et al. .................. 188/299

Primary Examiner—Douglas C. Butler
Attorney, Agent, or Firm—Christie, Parker & Hale, LLP

[57] ABSTRACT

An embodiment of the present invention is a valve for selectively establishing communication of a fluid between first and second fluid bodies having first and second pressures, respectively. A valve element is carried within a valve body for liner reciprocal movement along a valve axis between a first position wherein an operative portion at the front of the valve element blocks communication between the first and the second fluid bodies and a second position wherein the first and second fluid bodies are in communication. The movement is responsive to a rearward force exerted by the fluid on the valve element due to the first pressure. The rearward force is less than the product of the first pressure and a cross-sectional area of the first fluid swept by the valve element. An actuator is located at or behind the valve element for applying and modulating forward force to the valve element for controlling the response of the valve element to the first pressure when the valve is located between the first and second positions.

12 Claims, 8 Drawing Sheets

VARIABLE CONSTANT FORCE HYDRAULIC COMPONENTS AND SYSTEMS

CROSS-REFERENCE TO RELATED APPLICATION

This is a continuation of application Ser. No. 08/272,208 filed Jul. 8, 1994, now U.S. Pat. No. 5,529,152.

FIELD OF THE INVENTION

The present invention relates to vehicle suspension systems and, more particularly, to adjustable or controllable damping devices.

BACKGROUND OF THE INVENTION

Traditional vehicle suspension systems have included springs for supporting a sprung mass (i.e. the chassis) above an unsprung mass (i.e. the wheels and axles) and shock absorbers for damping relative vibration of the sprung and unsprung masses.

A traditional shock absorber utilizes a piston moving through a cylinder containing hydraulic fluid. The piston has a plurality of orifices to permit fluid to flow through the piston as it moves. The damping force generated by the shock absorber depends, inter alia, on the piston velocity and orifice size.

To improve vehicle handling and ride comfort, a variety of systems have been proposed wherein the shock absorber orifice size and/or geometry is controllable to adapt to varying road conditions. Additionally, so-called fully active suspensions have been proposed wherein a single hydraulic cylinder replaces the shock absorber and spring at each wheel. Additionally, a system has been proposed wherein the pressures in the compression and rebound chambers of the dampers are controlled by means of pressure regulators. The regulators are controlled either via a computer processor or a hydraulic/mechanical arrangement. For improved ride, in response to the control input, the damper provides a constant compression and/or rebound resistive force, which force is determined by the control system for each damper based upon the particular ride condition (acceleration, deceleration, cornering, bumps and the like). With such systems, for example, nosedive may be prevented upon braking by controlling the front dampers to provide a constant force resisting compression and the rear dampers to provide a constant force resisting rebound or extension. With any typical vehicle, braking results in a "weight transfer" from the rear wheels to the front wheels. This produces a relative compression of the front springs and extension of the rear springs, resulting in nosedive. If the weight transfer is, for example, an increase of 500 pounds to the front end of the vehicle and a decrease of 500 pounds to the rear end of the vehicle, a vehicle equipped with a constant-force system can set the pressure in the compression chambers of the forward dampers to yield the necessary 500 pounds (250 per damper) of resistive force so that the forward springs do not significantly compress. Conversely, the rebound chambers of the rear dampers provide a force resisting rebound of 250 pounds per damper so that the vehicle maintains a horizontal orientation.

If, under these conditions, the constant-force suspension-equipped vehicle hits a sharp bump or the like, so as to otherwise increase the pressure in the compression chamber, the pressure regulation provided by the system allows for a blow-off of fluid from the compression chamber so that the constant force is maintained.

Such systems are described in greater detail in James M. Hamilton, "Computer-Optimized Adaptive Suspension Technology (COAST)," *IEEE Transactions on Industrial Electronics*, Vol. IE-32, No. 4, Nov. 1985, and U.S. Pat. Nos. 4,634,142 and 4,722,548. The disclosures of these three documents are incorporated herein by reference.

There are, however, a few problems that must be dealt with in the constant-force design. One problem is the lack of force when the direction of travel of the damper is wrong (i.e., not being able to provide a force in the same direction as the wheel/damper travel). If the vehicle hits a bump when braking forces are applied, after the upward portion of the bump is reached, the wheel will start to travel in the rebound direction so that the compression forces cannot be maintained and can return only after the wheel reaches its lowest position and returns to the compression direction once again. Another problem is finding an electrically controllable pressure-regulating valve that has sufficient size (orifice flow area for very high flow rates experienced when hitting bumps at high speed) at a reasonable size and cost. There are large flow valves that are controllable, but they have many problems for the present applications, including large size, high hysteresis in their pressure regulation, expensive and complex feedback systems, and relatively slow response times.

It is an object of this invention to efficiently solve the problem encountered when the control forces are momentarily lost during damper movements in the undesired direction.

It is a further object of this invention to solve the valve performance issues while at the same time reducing their cost and size.

SUMMARY OF THE INVENTION

There is accordingly provided in practice of the preferred embodiment of the present invention a controllable pressure regulator or relief valve regulating compression or rebound forces in a damper system.

The valve regulates the relative pressure between primary and secondary fluid bodies. In particular, the valve limits the amount by which the pressure in the primary body exceeds that in the secondary body.

A valve element is carried within a valve body for linear reciprocal movement along a valve access between a first position wherein the valve element blocks communication between the primary and secondary fluid bodies and a second position wherein the primary and secondary fluid bodies are in communication. This movement of the valve is responsive to a force exerted by the fluid in the primary fluid body upon the valve element. An actuator controls the response of the valve element by applying and modulating a force which resists the force due to the primary fluid body. The actuator is controllable to regulate the corresponding pressure in the primary fluid body necessary to move the valve element between the first and second positions. The valve is configured so that the force applied by the primary fluid body to the valve element is less than the product of the pressure in the primary fluid body and the cross-sectional area of the primary fluid body which is swept by the valve element. This force is also substantially independent of the position of the valve element.

The resulting valve of this invention therefore provides very fast and stable operation with a relatively large orifice flow area that is controlled by a relatively small actuator, all of which fits within a very small package.

The use of compliance in the appropriate locations and with the appropriate capabilities is incorporated in such a way as to provide transitional forces during the time when the damper forces would otherwise be lost during bumps when the damper direction of travel is wrong for the desired pressure regulation.

Thus, the invention provides an integrated constant force damper that provides the required performance, cost and size necessary to make a constant force damping system that is viable for vehicular use.

BRIEF DESCRIPTION OF THE DRAWINGS

The features of the specific embodiment of the best mode contemplated of carrying out the invention are illustrated in the drawings, in which:

FIG. 3b is a top view of the piston of FIG. 3a;

DETAILED DESCRIPTION

Figure 2:
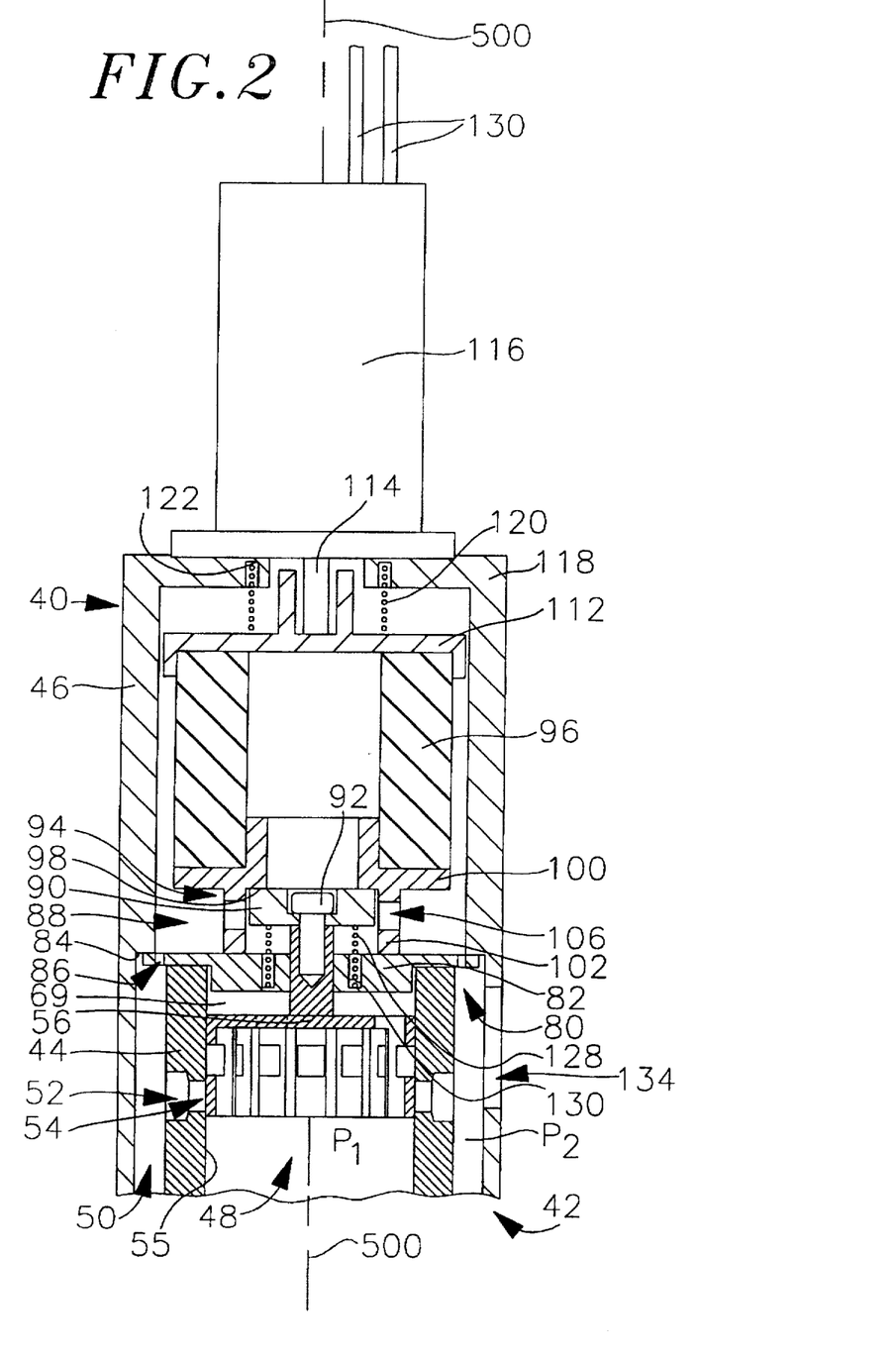
FIG. 2 is a cross-sectional view of a controllable relief valve according to principles of the present invention.

A controllable pressure regulator or relief valve is shown in FIG. 2. For purposes of exposition the valve is described with reference to the forward and rearward directions defined as the upward and downward directions of the orientation shown in FIG. 2. The lower or forward end 42 of the valve 40 defines a valve base. A valve body includes inner and outer concentric sleeves 44 and respectively, extending back from the base. A hydraulic fluid substantially fills the volumes which include the interior of the inner sleeve 44 and the annular space between the sleeves so as to define respective primary and secondary fluid bodies 48 and 50. To permit communication of fluid between the primary and secondary bodies, the inner sleeve 44 has perforations in the form of a ring of holes 52 encircling the sleeve and extending through from an annular slot 54 formed in the inner surface 55 of the inner sleeve (also see FIG. 4b).

Figure 3A:
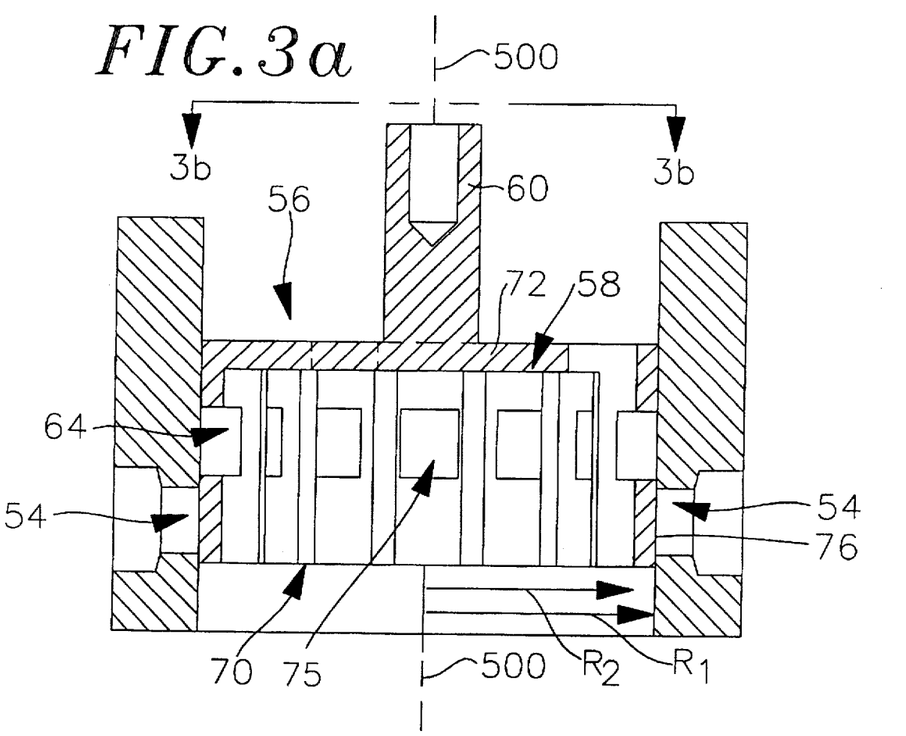
FIG. 3a is a cross-sectional view of the piston of the relief valve of FIG. 2.
Figure 3B:
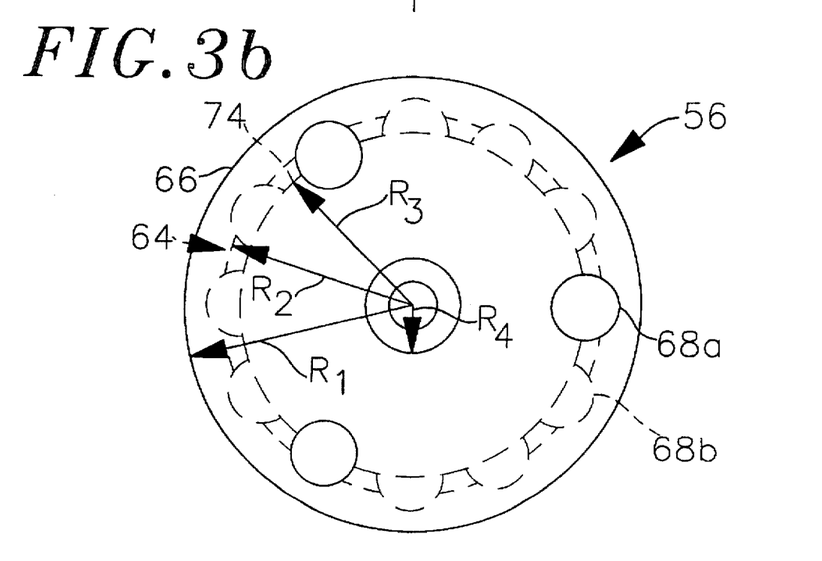

A valve element is formed as a piston 56 which is moveable within the inner sleeve 44 for selectively blocking communication between the primary and secondary fluid bodies. As is shown in detail in FIGS. 3a and 3b, the piston includes an operative portion 58 and a shaft portion 60 extending back therefrom. The structure of the piston is described with reference to steps of manufacture. The operative portion is initially formed as a right circular cylinder of nominal external radius $R_1$ which corresponds to the internal radius of the inner sleeve. A right annular slot 64 is centrally formed in the outer surface 66 of the operative portion and extends to a base radius $R_2$. Twelve holes or bores 68a and 68b are formed in the operative portion, oriented in a ring and extending back from the forward face 70 of the piston. The three bores 68a extend completely through the operative portion. These bores thus serve as ports permitting communication of the fluid in the primary fluid body through the operative portion of the valve to a region 69 therebehind. The size and number of these ports determine a degree of damping of the valve element as it moves through the primary fluid body (smaller and fewer ports resulting in greater damping). The nine bores 68b, arranged in groups of three between the bores 68a, terminate before reaching the back end 72 of the operative portion of the piston. A central bore 74 of radius $R_3$ (which is slightly smaller than $R_2$) extends back from the forward face 70 of the piston and terminates with the bores 68b. The peripheries of the bores 68a and 68b intersect with the slot 64 and central bore 74 so as to create ports 75 for allowing communication between the central bore and the slot.

The piston is carried within the inner sleeve for linear reciprocal movement along a valve axis 500 which is the central axis of the inner and outer sleeves. In a first position, shown in FIG. 3a, the cylindrical lateral surface 76 of the forward section of the operative portion of the piston blocks the slot 54 in the inner sleeve 44 so as to block communication between the first and second fluid bodies through the holes 52.

Figure 4A:
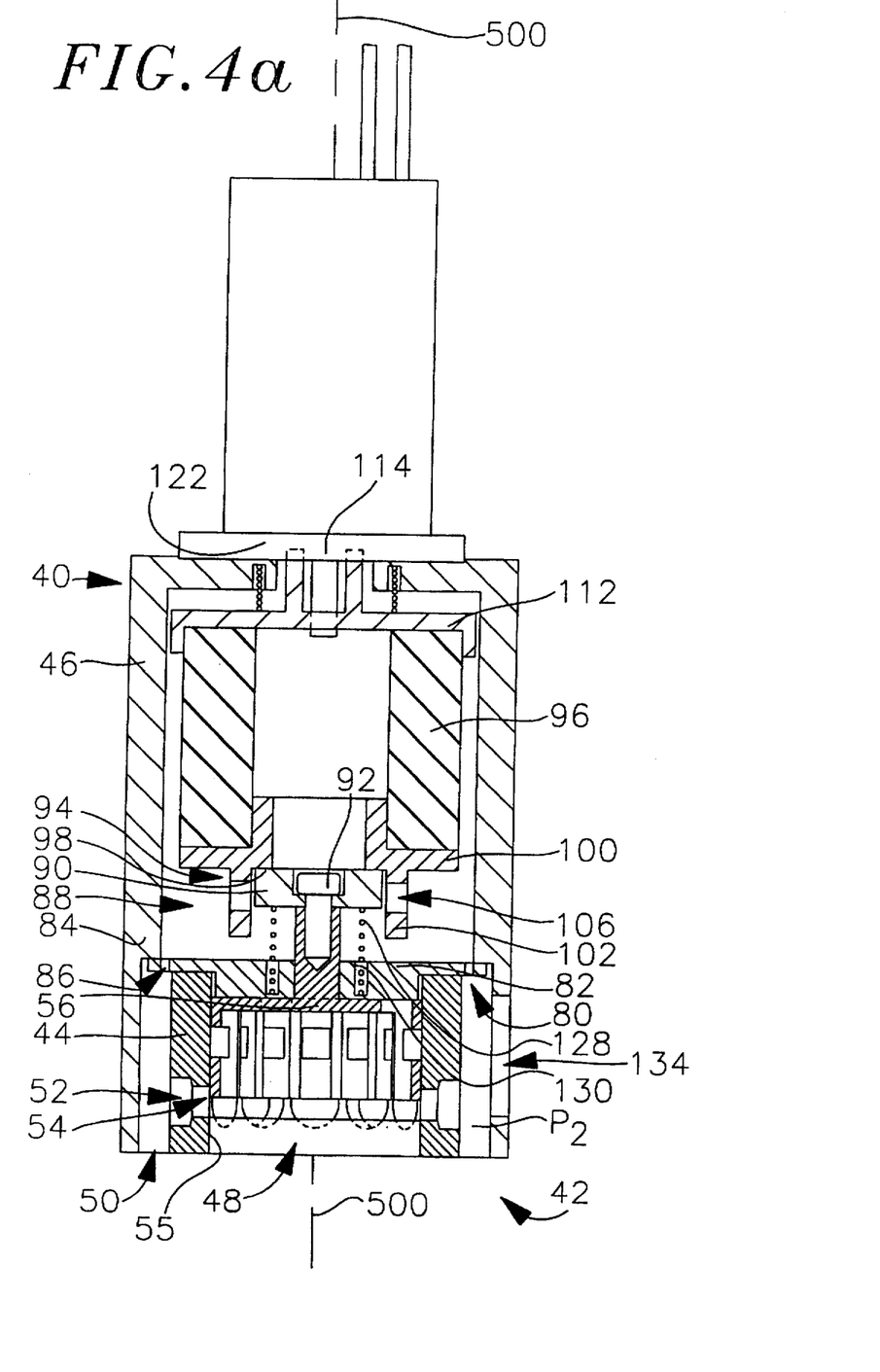
FIG. 4a is a side cross-sectional view of the valve of FIG. 2 with its piston in a retracted position.

In a second position, shown in FIG. 4a, the piston is drawn up (back) slightly so that the operative portion of the piston no longer blocks the slot and holes in the inner sleeve. This permits direct communication between the first and second fluid bodies.

Figure 4B:
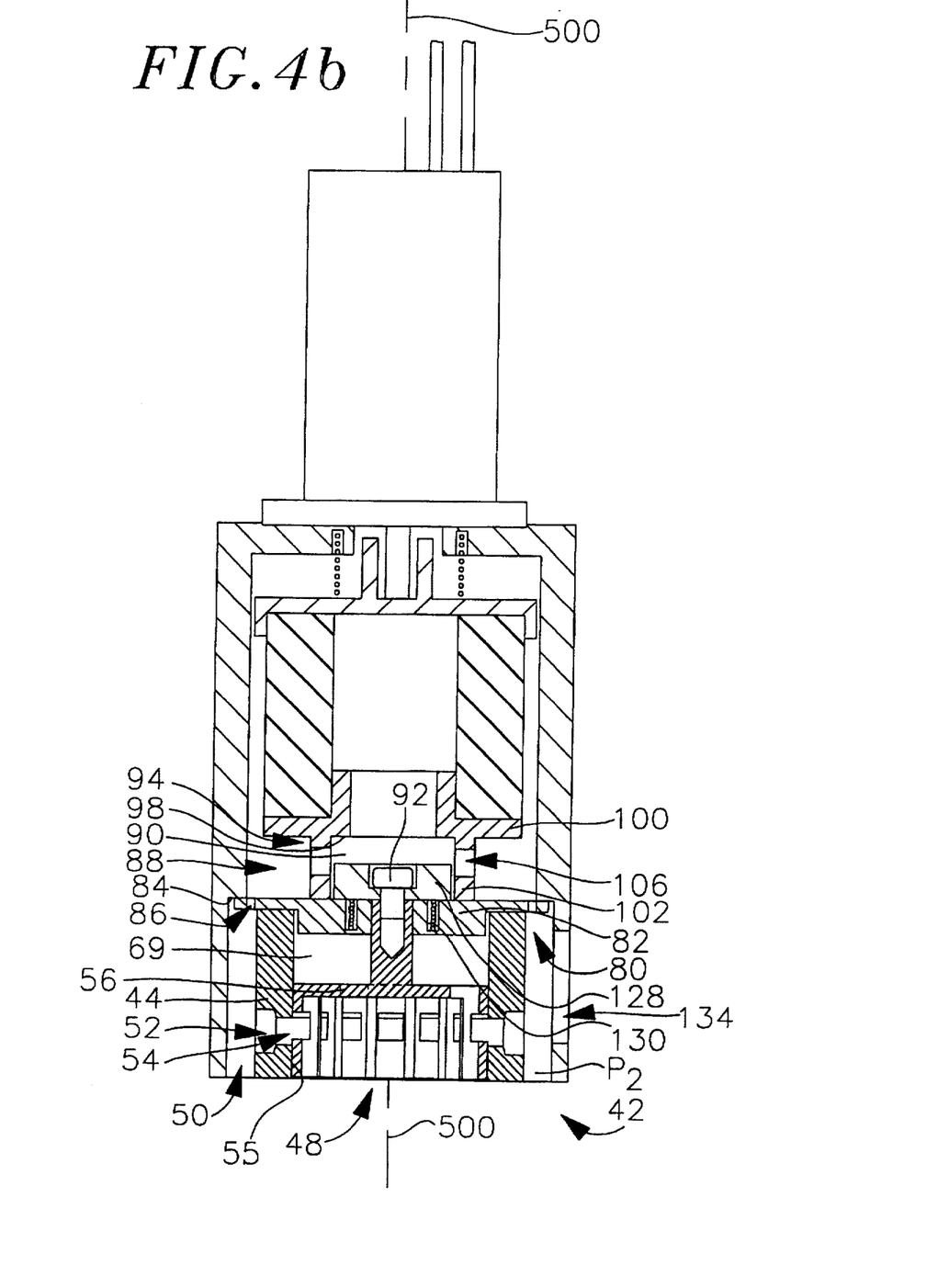
FIG. 4b is a side cross-sectional view of the valve of FIG. 2 with its piston in an extended position.

In a third position, shown in FIG. 4b, the piston is located below (forward of) the first position so that the slot 54 in the inner sleeve 44 is aligned with the slot 64 in the piston. This permits communication between the first and second fluid bodies through the piston.

Operation of the relief valve is described with respect to FIG. 2, wherein the piston is in the closed position as has been previously described. The valve is assumed to be in an equilibrium state wherein the pressure $P_1$ in the primary body is equal to or greater than the pressure $P_2$ in the secondary body. The back end 80 of the inner sleeve 44 is covered and sealed by a forward facing end plate 82, the back surface of which abuts an annular shoulder 84 formed in the outer sleeve 46. Adjacent the periphery of the end plate 82, a plurality of holes 86 extend through the plate from the annular space between the inner and outer sleeves to a space 88 behind the plate so as to establish the space 88 as a branch of the secondary fluid body 50.

The piston shaft 60 extends through a central bore in the end plate 82 and, at its back end, bears a disk-shaped cap 90, secured to the shaft by means of a counter-bored bolt 92.

Covering and abutting the disk-shaped cap 90 so as to restrict its rearward movement is a forward end cap 94 of a resilient ring 96. Specifically, the rear surface of the disk-shaped cap 90 abuts the forward surface 98 of a central disk portion 100 of the forward end cap 94. A forward sleeve portion 102 of the forward end cap extends forward from the forward surface 98 and at its forward end abuts the end plate 82. A plurality of ports 106 in the forward sleeve portion 102 permit communication between the interior of the forward sleeve portion and the space 88 external thereto.

The resilient ring 96 has a rear end cap 112 which engages the shaft 114 of a solenoid 116 mounted on the rear end plate 118 of the valve. Optionally, a pneumatic cylinder or other actuator may be used in place of the solenoid 116. A spring 120 mounted in an annular bore 122 in the forward surface of the rear end plate 118 engages the rear surface of the rear end cap 112 so as to bias the rear end cap, resilient ring and forward end cap forward to maintain engagement of the forward end cap with the end plate 82. A second spring 128 carried in an annular bore 130 in the rear face of the end plate 82 engages the lower face of the cap disk-shaped 90 for biasing the piston rearward so that the upper surface of the disk-shaped cap 90 engages the forward end cap 94. In the orientation shown in FIG. 2, the springs 120 and 128 are in a substantially relaxed condition so as to perform their function only upon further compression which for the spring 120 is when the valve element is in an orientation anywhere between that of FIG. 2 and FIG. 4a and for the second spring 128 when the valve element is in a position anywhere between that of FIG. 2 and FIG. 4b. Responsive to a control input or voltage applied over wiring 130, the solenoid 116 applies a forward force to the rear end cap 112, thereby compressing the resilient ring 96. The dimension of the rear end cap 112 may be selected to vary the dimensions of the annular gap between it and the outer sleeve 46 so as to provide a degree of damping for motion of the end cap and thus the solenoid.

Although the piston sweeps the cross-sectional area of the primary fluid body equal to $\pi(R_1)^2$, the rearward force applied by the primary fluid body to the piston is less than this figure, because the bores 68a permit communication through to the area behind the operative portion of the piston, between it and the end plate 82. Accordingly, if $R_4$ is the radius of the shaft 60 then the net rearward force applied by the primary fluid is $P_1\pi(R_4)^2$. Similarly, the secondary fluid applies a forward force on the rear end of the shaft 60 which is equal to $P_2 \pi(R_4)^2$. The net forward force on the piston due to the pressures of the two fluid bodies is $\pi(R_4)^2(P_2-P_1)$.

If the pressure $P_2$ in the secondary fluid body exceeds the pressure $P_1$ of the primary fluid body, there is a positive net forward force on the piston tending to pull it into the orientation shown in FIG. 4a. Although, this will be resisted by the spring 128, the spring constant is chosen so that the force exerted by the spring is substantially negligible (except as to biasing the valve into the orientation of FIG. 2 to resist movement caused by orientational changes or vibration as opposed to pressure differences in the fluid). As previously described, in this extended position the primary and secondary fluid bodies can communicate through the holes 52 and slot 54 in the inner sleeve and through the piston. Accordingly, in this way the valve functions as a check valve establishing communication between the primary and secondary fluid bodies when the pressure in the secondary fluid body exceeds that of the primary plus any desired figure established by the selection of the spring 128.

However, if the pressure $P_1$ of the primary body exceeds the pressure $P_2$ of the secondary body there will be a net rearward force on the piston equal to $\pi(R_4)^2(P_1-P_2)$. This is resisted by the force F applied by the solenoid 116 through the resilient ring 96. The forward force applied by the spring 120 is negligible, similar to the rearward force applied by the spring 128. This spring functions to hold the system of the piston, elastomeric ring and its end caps, and solenoid against unwanted rearward movement caused by orientation changes, vibrations and the like. Because of the increased mass that the spring 120 must handle, its spring constant will typically be proportionately higher than that of the spring 128.

As long as the force F exceeds the net upward force due to the fluid, the valve will maintain the orientation shown in FIG. 2. Once, however, the force F is exceeded by the force from the fluid, the piston will lift the ring 96 and its end caps into the position shown in FIG. 4b. As was previously discussed, with the valve in this retracted position, there is direct communication between the primary and secondary fluid bodies through the holes 52 and slot 54. Accordingly, fluid may flow from the primary body into the secondary body and through a port 134 to a reservoir or other volume. The pressure difference between the two fluid bodies diminishes to $P_1-P_2=F/(\pi(R_4)^2)$ the piston returns toward the position shown in FIG. 2.

Accordingly, the valve acts as a pressure regulator, limiting the amount by which the pressure $P_1$ can exceed the pressure $P_2$. The pressure difference is controlled by varying the force applied by the solenoid 116. As the piston sweeps only the primary fluid body, and the division between the primary and secondary fluid bodies is parallel to the piston axis, the force exerted by the primary fluid body on the piston is substantially independent of the location of the piston along its travel path and the flow of fluid between the primary and secondary bodies. When there is a sharp increase in the pressure $P_1$ relative to the pressure $P_2$, the piston is driven quickly back. As the piston is driven back, initially the solenoid shaft 114 is driven back more slowly than the piston with the resilient ring 96 compressing to make up the difference. After the valve is opened, this extra compression is relieved as the solenoid shaft eventually is driven back by distance equal to the displacement of the piston. Thus the presence of the resilient ring or an equivalent spring member reduces the response time of the valve when compared with a rigid linkage between the solenoid and piston. This reduces the pressure spike otherwise associated with the need to overcome the mass of the piston and actuator.

Figure 1:
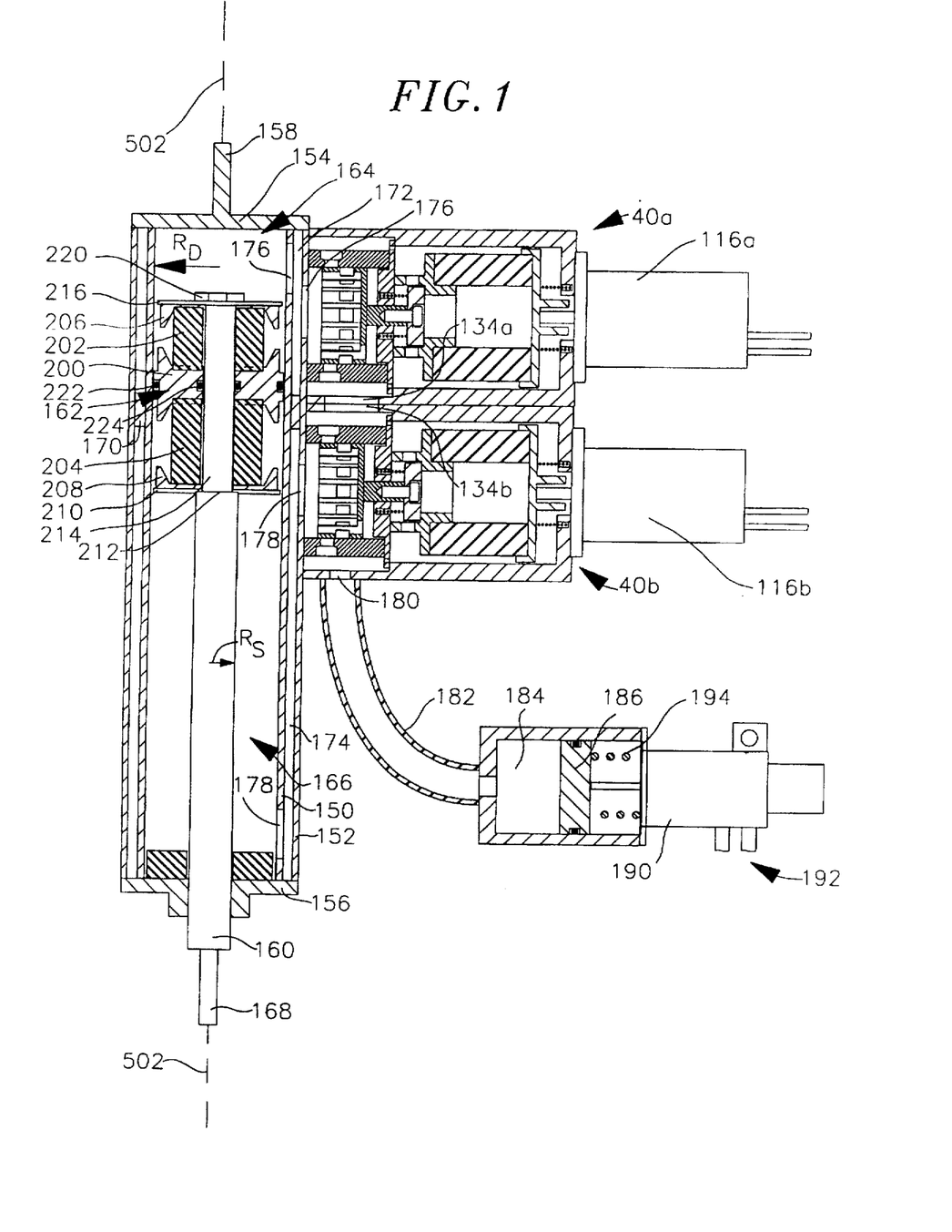
FIG. 1 is a cross-sectional view of a damper unit according to principles of the present invention.

A damper unit is shown in FIG. 1. The damper unit is configured for use in place of an automotive or similar vehicle shock absorber and is described with reference to a standard vertical orientation as is illustrated. The damper includes a body or case formed of concentric inner and outer sleeves 150 and 152, respectively, having a central axis 502 and sealed at their ends by upper and lower end caps 154 and 156, respectively. A threaded shaft 158 extends upwardly from the upper end cap 154 for attachment to the sprung mass of a vehicle. A shaft 160 extends through a central bore in the lower end cap 156. Its upper ends lies within the inner sleeve 150 and carries a piston 162 which divides the space within the inner sleeve into an upper chamber portion 164 and a lower chamber portion 166. At the lower end of the shaft 160, a threaded portion 168 depends for attachment to the unsprung mass of the vehicle. A fixed ring 170 divides the annular space between the inner and outer sleeves 150 and 152 into an upper and a lower annular space, 172 and 174, respectively. Upper and lower ports 176 and 178, respectively, in the inner sleeve 150 adjacent its upper and lower ends place the upper and lower annular spaces in communication with the upper and lower camber portions. A first relief valve 40a and a second relief valve 40b for regulating the pressures in the compression and rebound chambers, respectively, are mounted to the outer sleeve 152. Optionally, a single valve may be used to control the pressure in a single chamber or to alternately control the pressure in the compression and rebound chambers when the damper is in compression and rebound modes, respectively. The latter may be done using a series of check valves which place the primary fluid body of the valve in communication with one chamber at a time.

Except as is specifically described, the relief valves 40a and 40b are identical to the relief valve 40 of FIG. 2 and have similar elements designated with the same reference numeral followed by the letter a or b, respectively. The ports 134a and 134b of the two valves are placed in abutting relationship to permit communication between the secondary fluid bodies of the two valves to create a unitary secondary fluid body. Adjacent the front end of each valve, a port 176 and 178, respectively, formed in the outer sleeve 152 places the primary fluid bodies of the first and second valves in communication with the upper and lower annular spaces 172 and 174 so that the upper and lower chamber portions 164 and 166 become portions of the primary fluid bodies for the first and second valves, respectively.

A port 180 is formed in the outer sleeve of the second valve 40b. A hose 182 connects the port to a cylinder 184 in which rides a piston 186. Accordingly, the cylinder becomes a portion of the unitary second fluid body. A linear position transducer 190 is connected to the piston for measuring its displacement. A signal indicative of the transducer position is provided to a control system via wiring 192. The transducer and piston apply only minimal force to the second fluid body so that the second fluid body remains constant at essentially atmospheric pressure. Optionally, a spring 194 may be provided to bias the piston 186 against the fluid in the cylinder 184. This produces a slight increase in the baseline fluid pressures throughout the system to help improve hydraulic operation. The effect is somewhat similar to that the use of gas-charging in conventional shock absorbers. The spring can be used to apply a pressure much lower than in conventional gas-charged systems and has the advantages of physical simplicity and not needing gas-tight seals.

When the damper is placed under compression, the pressure $P_c$ in the upper or compression chamber portion 164 increases. Because this represents the primary fluid body for the first valve 40a, the pressure $P_c$ is regulated by the control input delivered to the solenoid 116a. At this time, the lower or rebound chamber portion 166 is being expanded rather than compressed. As this provides the primary fluid body for the second valve 40b, the piston 56a will function as a check valve, moving into the orientation shown in FIG. 4a so as to permit fluid flow from the unitary secondary fluid body into the rebound chamber 166.

Accordingly, when the damper is subject to compression, the pressure in the rebound chamber will be substantially atmospheric pressure so that the total resistive force applied by the damper to resist compression between the sprung and unsprung masses of the vehicle is $F_c = P_c \pi (R_D)^2$ wherein $R_D$ is the internal radius of the inner sleeve 150. This force $F_c$ can, accordingly, be governed by the input to the solenoid 116a.

When the damper is under extension or rebound rather than compression, the sprung and unsprung masses of the vehicle are being drawn apart so as to pull the piston 162 downward within the inner sleeve 150 so as to place the rebound chamber 166 under compression. In this rebound mode, the operations of the two valves 40a and 40b are substantially reversed from that of the compression mode. The first valve 40a operates as a check valve as has been previously described. The second valve 40b operates to regulate the pressure within the rebound chamber 166. The damper will resist the rebound by applying a force $F_r$ drawing the sprung and unsprung masses together. The force $F_r$ is equal to the product of the rebound pressure, as regulated by the second valve 40b, and the cross-sectional area upon which it operates. Thus, the rebound force $F_r = P_r \pi ((R_D)^2 - (R_S)^2)$ wherein $R_S$ is the radius of the shaft 160.

As the piston 162 moves within the inner sleeve, the length of the shaft 160 within the damper varies. As the shaft is inserted into the chamber while the damper is compressed, an amount of hydraulic fluid equivalent to the distance of insertion multiplied by the cross-sectional area of the shaft must be displaced through the valve 40a and into the reservoir 184. Similarly, as the shaft is extracted, fluid is drawn from the reservoir 184 and back into the compression chamber. Accordingly, the position of the reservoir piston 186 is directly coupled to the position of the damper piston 162. The linear position transducer 190, provides an output (over wiring 192) which indicates the extension of the shaft 160 and, thus, the relative position of the sprung and unsprung masses at the damper.

For cushioning abrupt initial motion of the shaft 160 relative to the remainder of the damper, the piston 162 is formed as a central rigid member 200 held between an upper and a lower resilient ring 202 and 204, respectively. The upper and lower rings are, at their respective upper and lower ends, held by upper and lower flange members 206 and 208. The lower flange member abuts a lower washer 210 carried on an annular upward facing shoulder 212 of the shaft 160 separating the main body of the shaft from an upper shaft section 214 of reduced radius. The upper flange abuts a washer 216 at the upper end of the shaft which is held by a bolt 220. The central member 200 carries an outer O-ring 222 which rides in an outwardly facing annular bore and seals against the inner sleeve 150. An inner O-ring 224 rides in an inwardly facing annular bore formed in a central longitudinal bore through the central member which encompasses the upper shaft section 214. The inner O-ring 224 forms a seal between the central member 200 and the upper shaft section 214. Together, the O-rings 222 and 224 isolate the compression and rebound chambers so that no fluid passes directly between. Although elastomeric (rubber) O-rings are shown, these elements may be replaced by PTFE quadrings or bands or other appropriate seal materials and configurations.

Upon abrupt compression of the damper, the shaft 160 is driven upward. Fluid in the compression chamber 164 passes around the upper flange 206 and exerts a pressure downwardly on the central member 200. This pressure causes the lower resilient ring 204 to compress. Similarly, upon rebound the fluid in the rebound chamber 166 passes around the lower flange 208 and exerts an upward pressure on the central member 200 which compresses the upper resilient ring 202. The compliance provided by this system reduces the requirement for the relief valves 40a and 40b to activate very quickly upon short or abrupt motions and reduces high frequency vibrations and harshness when the vehicle hits bumps.

Exemplary specifications for the damper of FIG. 1, dimensioned as a heavy-duty damper for use on a large vehicle such as a bus or motor home, are:

Solenoid 116 is a model PS-16 solenoid manufactured by Elwood Hydraulics Company, Inc. It has a linear stroke of approximately 0.125 inch at a force control range of 0 to 35 pounds. It also has an approach zone of 0.125 inch. In the approach zone the control force drops off. Therefore, there is a spring that is an integral part of the solenoid that compresses in this range so as to offset the drop in force. The benefit of allowing the solenoid to open a full 0.25 inch is that the largest flow area can be achieved for very fast flow rates (bumps).

The radius $R_4$ of pressure-sensing piston 60 is 0.125 inch, giving an area of approximately 0.05 square inch. Controlled by the solenoid, this yields a pressure control range of from 0 to 700 psi (35 pounds/0.05 square inch).

The radius $R_D$ of piston 162 is 1.2 inches for an area of approximately 4.5 square inches, giving a controlled damping force of approximately 0 to 3,000 pounds (4.5 square inches*700 psi).

The radius $R_1$ is approximately 0.5 inch and the slot height 0.25 inch (the stroke of the solenoid) to allow for sufficient flow area for the fluid that is displaced by the piston 162.

The resilient member 96 allows for approximately 0.05 inch of compression (⅕ of the stroke) at 35 pounds of force. Note that when the solenoid is powered to its full 35 pounds and the valve is in the closed position, the resilient member will be compressed 0.05 inch when the tolerances are appropriately set so that the full 700 psi will be required to open the valve as described.

The reservoir piston 186 has a diameter of approximately 2 inches and a stroke of 1.5 inches.

The reservoir spring 194 has a compressed force at normal position of about 150 pounds for a bias pressure of 50 psi (150 pounds/3 square inches).

The piston compliance consists of compression resilient member 204 that provides about 3,000 pounds at about 2 inches of travel, and a rebound resilient member 202 that provides about 3,000 pounds at about 1 inch of travel. The lesser rebound is consistent with conventional damping design philosophy where the rebound forces are higher than the compression forces to minimize harshness and make best use of the space available. The 3,000-pound force range covered by the compliance is selected to match the maximum control force.

Figure 5:
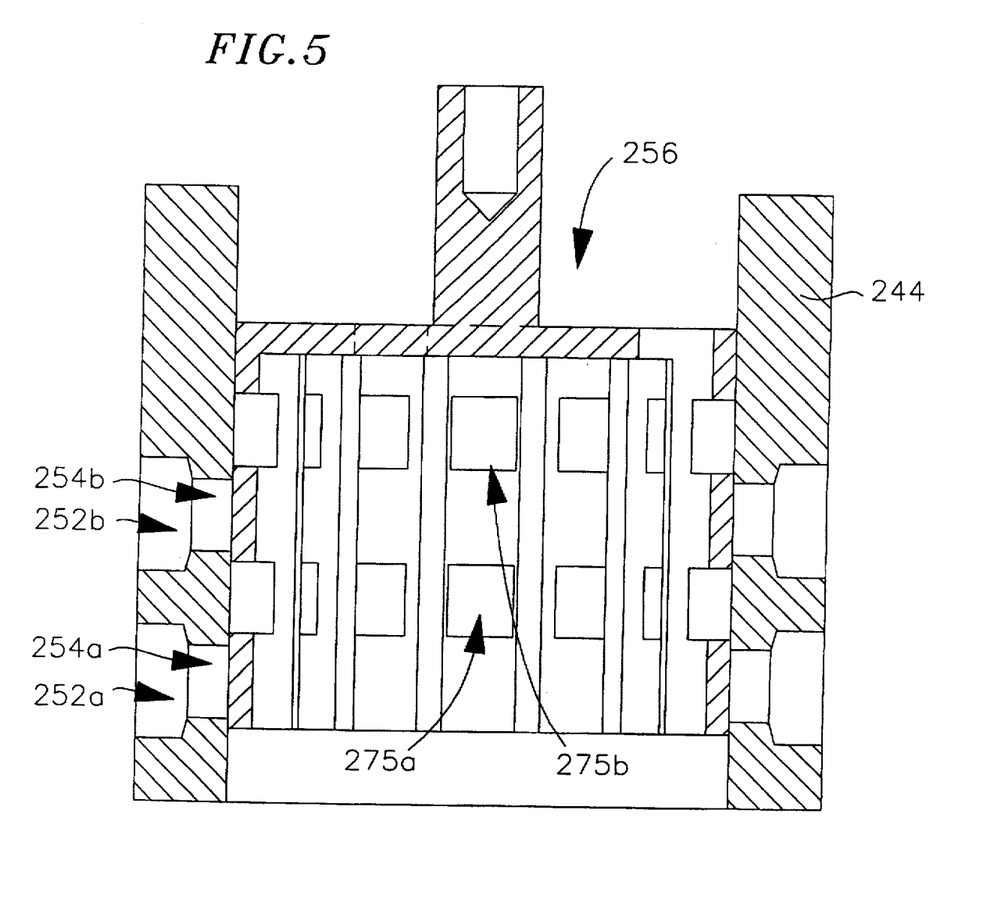
FIG. 5 is a side cross-sectional view of a dual-slot valve piston.

An alternate dual-slot valve piston 256 and inner sleeve 244 is shown in FIG. 5. Otherwise identical to the piston and sleeve 56 & 44 of FIG. 3a, the piston and sleeve each have two rings of ports. The sleeve has forward and rear slots 254a and 254b and holes 252a and 252b, respectively. Similarly, the piston has a forward and a rear ring of ports 275a and 275b, respectively. The dual slot (or even higher multiple) valve allows for more communication and greater flow between the primary and secondary fluid bodies, while not necessitating that either the valve and solenoid travel be increased (to facilitate longer ports (front to rear)) or requiring the piston radius to be increased.

Figure 6:
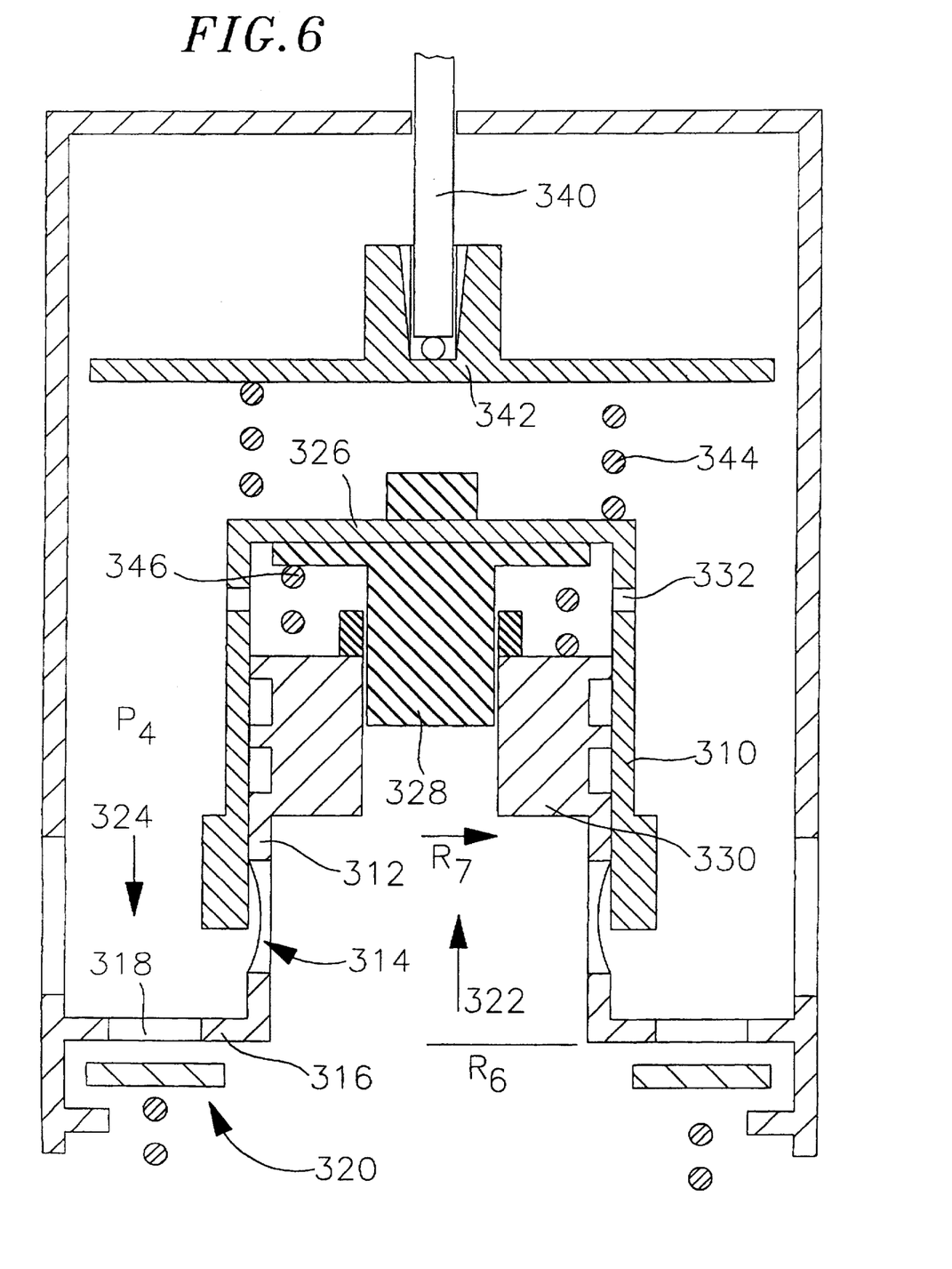
FIG. 6 is a cross-sectional view of a second controllable relief valve according to principles of the invention.

An alternate valve configuration is shown in FIG. 6 wherein the valve element is a cap member 310 which fits over an internal sleeve member 312 having a ring of ports 314 having beveled edges. The internal sleeve 312 extends upwardly from a web 316 having a ring of longitudinal holes 318 which are sealed by a spring-loaded check valve 320. The primary fluid body 322 is the area within and below the internal sleeve 312 and web 318, respectively. The secondary fluid body 324 is the region outside of and above the internal sleeve and web, respectively. The check valve prevents flow from the primary to the secondary bodies through the holes 318, but permits the reverse flow. The inner sleeve has an internal radius $R_6$ which determines the effective swept area of the valve (the cross-sectional area of the primary fluid body perpendicular to the valve element travel and adjacent the ports 314). The valve element 310 has a top portion 326 from which depends a piston 328 of nominal radius $R_7$ which passes through a bore of substantially identical radius in a cover portion 330 of the internal sleeve 314. A ring of ports 332 in the valve element 310 adjacent its top permit communication of the secondary fluid into the area within the valve element and above the internal sleeve. The ports 332 are sized to provide a degree of damping for motion of the valve element by restricting this flow of fluid. The primary fluid body applies an upward force to the valve element which is equal to the pressure in the primary fluid multiplied by the cross-sectional area of the piston 328 ($\pi R_7^2$). Since $R_6$ is greater than $R_7$, the force applied by the primary fluid is less than the product of $P_3$ and the swept area $\pi R_6^2$. Similarly, the secondary fluid body applies a downward force equal to its pressure times the same area. If $P_3$ and $P_4$ designate the pressures in the primary and secondary fluid bodies, respectively, there is a net downward force of $(P_4-P_3)(\pi R_7^2)$. A solenoid having a shaft 340 applies a downward force via a plate 342 and spring 344 to the top portion 326 of the valve element. The solenoid and spring function similarly to the solenoid and resilient ring of the valve of FIG. 2. A spring 346 located between the upper end of the inner sleeve 312 and the top 326 of the valve element 310 bias the valve in an open direction.

In operation, when the net upward force resulting from the pressures in the first and second fluid bodies is greater than the force applied by the solenoid, the valve element moves upward permitting communication through the ports 314. The force exerted by the spring 346 is largely negligible, serving primarily to smooth the operation of the valve.

Figure 7:
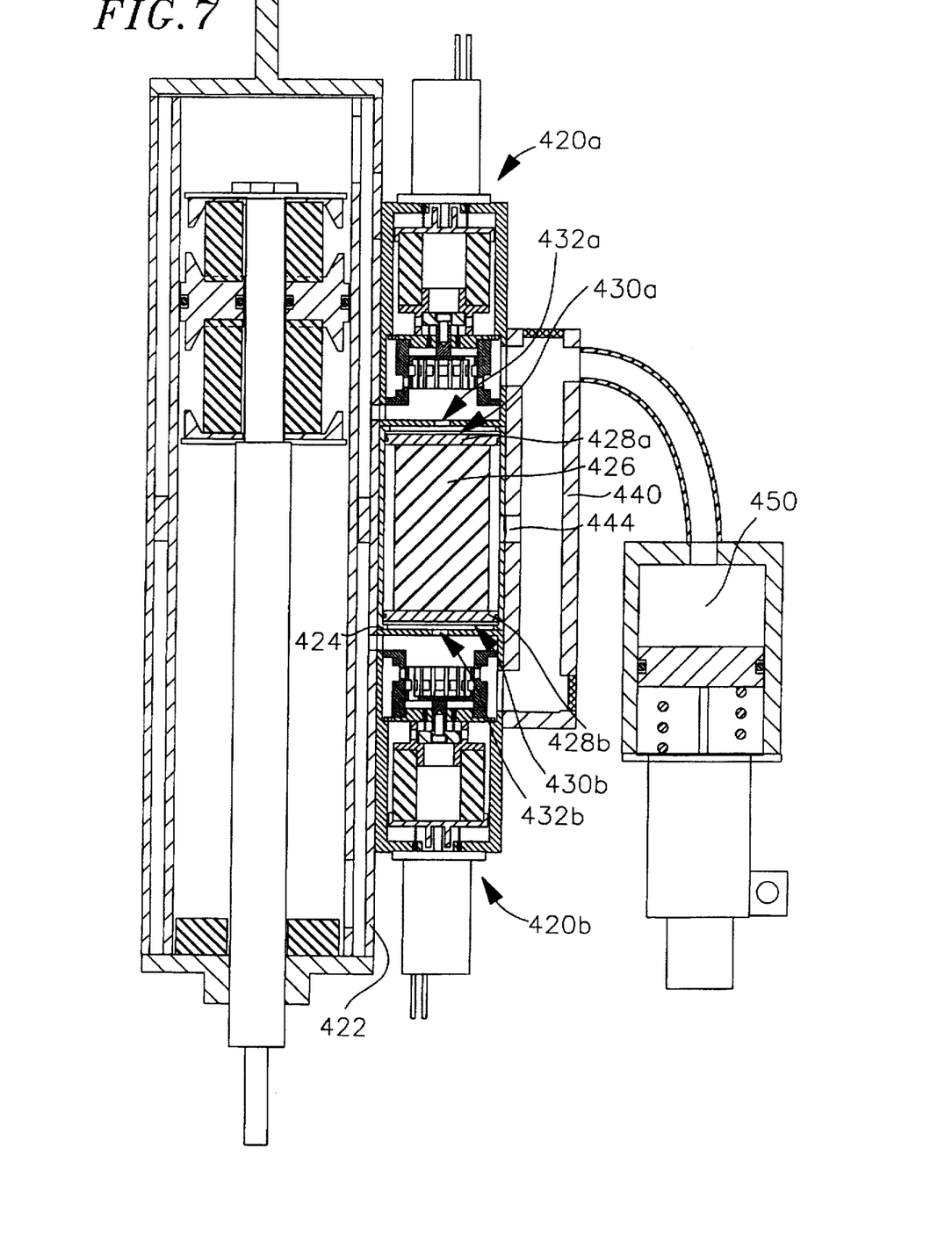
FIG. 7 is a cross-sectional view of a damper having hybrid compliance according to principles of the present invention.

A damper with a hybrid compliance is shown in FIG. 7. The damper piston and relief valves are largely identical to those of FIG. 1. The upper and lower valves 420a and 420b are oriented vertically, alongside the outer sleeve 422 of the damper. The two valves face each other so that their axes coincide and are separated by a compliance cylinder 424. Within the cylinder is a moveable compliance piston having a central resilient member 426 and upper and lower rigid end plates 428a and 428b, respectively, at upper and lower ends of the central resilient member and contacting fluid within the cylinder. These disk-shaped end plates have O-rings riding in outwardly facing bores in their circular peripheries for forming a seal with the cylinder 424. An upper and a lower volume 430a and 430b are confined between the upper and lower ends of the cylinder and the upper and lower end plates, respectively. The upper volume is in communication with the compression chamber of the damper and the lower volume in communication with the rebound chamber of the damper.

A manifold 440 connects the outlets from the secondary fluid bodies of the upper and lower valves to establish the unitary secondary fluid body and further connects to a cylinder 450 otherwise similar to the cylinder 184 of the damper of FIG. 1. A port 444 extends from the manifold through to a central location within the cylinder 424. Upon compression of the central resilient member, for example when a pressure increase in the compression chamber presses the upper plate 428a downward while the lower plate 428b is restrained by the end of the cylinder, fluid may escape from the cylinder into the manifold.

The upper and lower volumes 430a and 430b are additionally bounded by end plates formed at the bases of the upper and lower valves and having central ports 432a and 432b to establish communication between the respective volumes and the compression and rebound chambers of the damper. The diameter of the ports 432a and 432b may be chosen to provide a degree of damping for motion of the compliance piston. For example, to provide the high forces associated with wheel hop (typically a 1–2 inch oscillation occurring at approximately 10 Hz), which, for a large car are often on the order of 1,000 pounds, small ports or orifices are desirable so that at the high-frequency (approximately 10 Hz) the fluid will not be able to enter the compliance cylinder, which would otherwise prevent the chambers from achieving the desired resistive force. Such an orifice, however, allows the fluid to act upon the compliance for lower-frequency oscillations such as roll and pitch motions which occur at frequencies on the order of 1 Hz. It is commonly recognized that the control of hop is primarily governed by the rebound port 432b so that the compression port 432a need not necessarily be of reduced size.

The compliance provided by the compliance piston may be used in conjunction with the compliance of the damper piston or as a substitute therefor. Similarly, in the damper of FIG. 1, the upper and lower annular spaces between the inner sleeve and the flange 206 (and washer 216) and flange 208 (and washer 210), respectively provide orifices which serve to dampen the compliance and can be similarly selected to control wheel hop.

Exemplary specifications for the damper of FIG. 7, dimensioned as a heavy-duty damper for use on a large vehicle such as a bus or motor home, are:

The specifications provided for the damper of FIG. 1, except the compliance on the piston would be substantially reduced in force and travel. The piston compression resilient member 204 provides approximately 750 pounds at about 0.5 inch of travel, and the rebound resilient member 202 provides approximately 1,000 pounds at about 0.25 inch of travel or may even be eliminated. The significant reduction in piston compliance is replaced by the external compliance. The external compliance will be required when there is insufficient stroke space within the damper body 150 to accommodate the length of the compliance piston that would otherwise be required.

The compliance cylinder 424 has a diameter of approximately 2.4 inches (close to the diameter of the piston 162).

The resilient member 426 has a spring rate of approximately 1,500 pounds/inch and a travel of about 2 inches, again providing the maximum control force of 3,000 pounds.

The compression control orifice 432a is large so as not to interfere with flow, typically 1.5 inches.

The rebound control orifice 432b is smaller in order to stiffen the rebound compliance at the higher frequencies to control the unsprung mass, typically 0.4 inch. The use of rebound only to control the unsprung mass is also consistent with conventional damping philosophy.

While preferred embodiments of a damper and its associated relief valves have been described and illustrated herein, other constructions will be apparent to those skilled in the art. Additionally, such valves and dampers may be used, where appropriate, in non-vehicular applications. It is therefore to be understood that, within the scope of the appended claims, the invention may be practiced otherwise than as specifically described.

What is claimed is:

1. A valve for selectively establishing communication of a fluid between first and second fluid bodies having first and second pressures, respectively, the valve comprising:

a valve body;

a valve element carried within the valve body for linear reciprocal movement along a valve axis between a first position wherein an operative portion at a first side of the valve element blocks communication between the first and second fluid bodies and a second position wherein the first and second fluid bodies are in communication, said movement responsive to a force exerted by the fluid on the valve element due to the first pressure, which force is proportional to the product of the first pressure and a cross-sectional area of the first fluid swept by the valve element; and an actuator in communications with the valve element for applying and modulating an opposing force to the valve element for controlling the response of the valve element to the first pressure when the valve is located between the first and second positions.

2. The valve of claim 1 wherein the valve element is moveable within a sleeve formed in the valve body and having perforations, the first and second fluid bodies communicating through the perforations when the valve element is in the second position.

3. The valve of claim 2 wherein the operative portion has at least one port permitting communication of the fluid through the operative portion of the valve to a region behind the operative portion.

4. The valve of claim 3 wherein the operative portion has an inlet in constant communication with the first fluid body and an outlet in communication with the inlet and sealed by the sleeve when the valve element is in the first position and in communication with the second fluid body when the valve element is in the second position.

5. The valve of claim 1 comprising a resilient member coupling the valve element to the actuator so as to permit an initial movement of the valve element greater than an initial movement of the actuator responsive to an increase in the first pressure.

6. The valve of claim 1 wherein the actuator comprises a solenoid.

7. A damper comprising:

a piston carried within a fluid-containing chamber for reciprocation along a piston axis and separating upper and lower chamber portions;

a shaft operatively connected at a first end to the piston and extending through the lower chamber portion along the piston axis with a second end external to the chamber; and a valve for selectively establishing communication between first and second fluid bodies having first and second pressures, respectively, the valve comprising a valve body;

a valve element carried within the valve body for linear reciprocal movement along a valve axis between a first position wherein an operative portion at a first side of the valve element blocks communication between the first and second fluid bodies and a second position wherein the first and second fluid bodies are in communication, said movement responsive to a force exerted by the fluid on the valve element due to the first pressure, which force is proportional to the product of the first pressure and a cross-sectional area of the first fluid swept by the valve element; and an actuator in communications with the valve element for applying and modulating an opposing force to the valve element for controlling the response of the valve element to the first pressure when the valve is located between the first and second positions; wherein the valve is connected to the damper so that the lower chamber provides the first fluid body.

8. The damper of claim 7 further comprising a second said valve as defined in claim 7 connected to the damper so that the upper chamber provides the first fluid body for the second valve.

9. The damper of claim 7 further comprising accommodating means for accommodating changes in volume of the second fluid body in the first and second valves, the accommodating means comprising a linear position transducer for measuring a volume of displaced fluid, and a piston in contact with the second fluid.

10. The damper of claim 7 further comprising accommodating means for accommodating changes in volume of the second fluid body in the first and second valves, the accommodating means comprising a spring for biasing the piston for increasing the baseline fluid pressure within the damper.

11. The damper of claim 7 further comprising a spring-loaded check valve integrated around the circumference of the valve to prevent fluid flow from the first fluid body to the second fluid body and to permit fluid flow from the second fluid body to the first fluid body.

12. A method using a valve for selectively establishing communication of a fluid between first and second fluid bodies having first and second pressures, respectively, the valve comprising:

a valve body;

a valve element carried within the valve body for linear reciprocal movement along a valve axis between a first position wherein an operative portion at the front of the valve element blocks communication between the first and second fluid bodies and a second position wherein the first and second fluid bodies are in communication, said movement responsive to a rearward force exerted by the fluid on the valve element due to the first pressure, which rearward force is proportional to the product of the first pressure and a cross-sectional area of the first fluid swept by the valve element, the method comprising the step of using an actuator located at or behind the valve element for applying and modulating forward force to the valve element for controlling the response of the valve element to the first pressure when the valve is located between the first and second positions.

\* \* \* \* \*